(12) United States Patent
Shrivastava et al.

(10) Patent No.: US 9,525,519 B2
(45) Date of Patent: Dec. 20, 2016

(54) METHOD AND SYSTEM OF TRANSFERRING DATA IN A CARRIER AGGREGATION ENVIRONMENT

(75) Inventors: Vinay Kumar Shrivastava, Bangalore (IN); Venkateswara Rao Manepalli, Bangalore (IN)

(73) Assignee: Samsung Electronics Co., Ltd (KR)

( * ) Notice: Subject to any disclaimer, the term of this patent is extended or adjusted under 35 U.S.C. 154(b) by 871 days.

(21) Appl. No.: 13/696,230

(22) PCT Filed: May 3, 2011

(86) PCT No.: PCT/KR2011/003298
§ 371 (c)(1),
(2), (4) Date: Nov. 5, 2012

(87) PCT Pub. No.: WO2011/139069
PCT Pub. Date: Nov. 10, 2011

(65) Prior Publication Data
US 2013/0044726 A1    Feb. 21, 2013

(30) Foreign Application Priority Data
May 3, 2010    (IN) .......................... 1239/CHE/2010

(51) Int. Cl.
| H04L 1/16 | (2006.01) |
| H04L 1/18 | (2006.01) |
| H04L 5/00 | (2006.01) |
| H04W 72/04 | (2009.01) |
| H04W 72/14 | (2009.01) |

(52) U.S. Cl.
CPC ........... *H04L 1/1685* (2013.01); *H04L 1/1854* (2013.01); *H04L 1/1864* (2013.01); *H04L 5/001* (2013.01); *H04W 72/0453* (2013.01); *H04W 72/14* (2013.01)

(58) Field of Classification Search
CPC . H04W 72/02; H04W 72/1242; H04L 5/0007; H04L 5/0064
See application file for complete search history.

(56) References Cited

U.S. PATENT DOCUMENTS

| 2008/0151830 A1 | 6/2008 | Leppisaari et al. | |
| 2009/0203374 A1* | 8/2009 | Chun ................... | H04L 1/1628 455/425 |
| 2012/0057547 A1* | 3/2012 | Lohr .................... | H04L 5/0007 370/329 |

OTHER PUBLICATIONS

PCT/ISA/237 Written Opinion issued on PCT/KR2011/003298 (pp. 5).
PCT/ISA/210 Search Report issued on PCT/KR2011/003298 (pp. 3).

(Continued)

*Primary Examiner* — Siming Liu
(74) *Attorney, Agent, or Firm* — The Farrell Law Firm, P.C.

(57) ABSTRACT

Disclosed is a method for communicating service data units/Packet Data Units (PDUs) in a carrier aggregation environment, including receiving a plurality of grants on a plurality of active component carriers from an Evolved Node B, allocating transmission resources associated with the plurality of grants to at least one Radio Link Control (RLC) entity of a user equipment, identifying one of the allocated transmission resources associated with one of the plurality of grants by the at least one RLC entity based on criteria for communicating a status report, and transmitting a status PDU including the status report using the identified one of the allocated transmission resources.

22 Claims, 6 Drawing Sheets

(56) References Cited

OTHER PUBLICATIONS

Seidel, Eiko et al., White Paper-Dual Cell HSDPA and its Future Evolution, Nomor Research GmbH, Jan. 2009 (pp. 5).
Parkvall, Stefan et al., The Evolution of LTE towards IMT-Advanced, Journal of Communications, vol. 4, No. 3, Apr. 2009 (pp. 9).
Li, Jian et al., Flexible Carrier Aggregation for Home Base Station in IMT-Advanced system, IEEE 2009 (pp. 4).

* cited by examiner

METHOD AND SYSTEM OF TRANSFERRING DATA IN A CARRIER AGGREGATION ENVIRONMENT

PRIORITY

This application is a National Phase Entry of PCT International Application No. PCT/KR2011/003298, which was filed on May 3, 2011, and claims priority to Indian Patent Application No. 1239/CHE/2010, which was filed in the Indian Patent Office on May 3, 2010, the contents of which are incorporated herein by reference.

BACKGROUND OF THE INVENTION

1. Field of the Invention

The present invention relates generally to wireless communications, and more particularly, to transferring data in a carrier aggregation environment.

2. Description of the Related Art

Wireless communication systems have been widely deployed to provide various communication services such as voice, video, packet data, broadcast, and messaging. These systems may be multiple-access systems capable of supporting communication for multiple users by sharing available system resources.

Typically, a wireless communication medium is subject to impairments due to path loss, signal attenuation, multi-path fading, and shadowing, for example. Thus, a receiver (e.g., user equipment, or Evolved Node B (eNB)) may find data packets lost over a radio channel or receive erroneous data packets that are discarded at the receiver. In this case, a Radio Link Control (RLC) entity at the receiver may discover that some sequence numbered data packets are missing. Accordingly, the RLC entity at the receiver indicates a positive ACKnowledgement (ACK) for successfully received data packets and Negative ACKnowledgment (NACK) for lost data packets to an RLC entity at a transmitter. Based on the status report, the transmitter RLC entity may re-transmit the NACK data packets and flush the ACK data packets.

In high data rate wireless communication systems, a data channel is shared among multiple User Equipments (UEs). The wireless network performs a scheduling operation and provides each of the UEs with respective grant such that each of the UEs utilizes transmission resources indicated in the grant to transmit data packets. A given UE may have many data services or applications, such as Internet browsing, Wireless Application Protocol (WAP), email client, and messenger, running on the UE at any given instant. Each of these data services can be mapped to a single radio bearer. There are few radio bearers supporting only signaling information exchange between the UE and the network, as a plurality of radio bearers is active in the UE. Typically, the UE distributes the transmission grant provided by the wireless network among one or more active radio bearers. While scheduling, the UE considers priority and data rate requirements of the radio bearers to be scheduled. Thus, the UE performs scheduling per radio bearer.

Recently, in wireless communication technologies such as Long Term Evolution (LTE)/LTE Advanced (LTE-A), carrier aggregation has been introduced such that two or more component carriers are aggregated in order to support wider transmission bandwidths up to 100 MHz and for spectrum aggregation. The carrier aggregation technique enables a UE to be configured to aggregate a different number of component carriers originating from the same eNB and of possible different uplink and downlink bandwidths.

In carrier aggregation, the UE may receive transmission grants on all active component carriers in the same subframe. Therefore, the UE may have multiple grants available for scheduling the radio bearers. This type of scheduling is also known as logical channel prioritization, and may be serially or jointly executed for all the grants for the concerned component carriers.

Existing techniques fail to handle multiple grants as could occur in carrier aggregation scenarios, leading to inefficient mapping of an RLC status report to any of the grants. As a consequence, smaller status reports may be transmitted to peer entities and incomplete status reports may be generated instead of complete status reports. Moreover, the transmitter RLC entity may not know which of the data packets are transmitted successfully and which are not.

Further, in carrier aggregation systems, the UE triggers a Radio Resource Control (RRC) connection re-establishment procedure when a data packet reaches a maximum number of re-transmissions. The RRC connection re-establishment procedure is an expensive procedure leading to data suspension. As there is no direct mapping between the data packets and component carriers, triggering an RRC connection re-establishment procedure when some of the component carriers have a bad signal condition while the remainder of the component carriers has a good signal condition is undesirable.

SUMMARY OF THE INVENTION

The present invention has been made to address at least the above problems and/or disadvantages and to provide at least the advantages described below. Accordingly, an aspect of the present invention provides a method of a UE for communicating status Packet Data Units (PDUs) to an eNB in a carrier aggregation environment, comprising receiving a plurality of grants on a plurality of active component carriers from an eNB, allocating transmission resources associated with the plurality of grants to at least one RLC entity of the UE, identifying one of the allocated transmission resources associated with one of the plurality of grants by the at least one RLC entity based on criteria for communicating a status report and transmitting a status PDU including the status report using the identified one of the allocated transmission resources.

The present invention discloses a UE comprising a processor and memory coupled to the processor and configured to temporarily store instructions that, when executed by the processor, result in performing a method comprising receiving a plurality of grants on a plurality of active component carriers from an eNB, allocating transmission resources associated with the plurality of grants, identifying one of the allocated transmission resources associated with one of the plurality of grants based on criteria for communicating a status report and transmitting a status PDU including the status report using the identified one of the allocated transmission resources.

The present invention discloses a method of a UE for transferring data to an eNB in a carrier aggregation environment, comprising receiving a plurality of grants on a plurality of active component carriers from an eNB, allocating transmission resources associated with the plurality of grants to at least one RLC entity of the UE, identifying one of the allocated transmission resources associated with one of the plurality of grants by the at least one RLC entity based on criteria and transmitting a data using the identified one of the allocated transmission resources.

The present invention discloses a UE comprising a processor and memory coupled to the processor and configured to temporarily store instructions that, when executed by the processor, result in performing a method comprising receiving a plurality of grants on a plurality of active component carriers from an eNB, allocating transmission resources associated with the plurality of grants, identifying one of the allocated transmission resources associated with one of the plurality of grants based on criteria for communicating a status report and transmitting data using the identified one of the allocated transmission resources.

The present invention discloses a method of a transmitter for receiving status report information from a receiver in a carrier aggregation environment, comprising receiving a status PDU including a status report indicating status of data transmitted to a receiver, determining whether the status report in the status PDU is a complete status report, if so, processing the complete status report received in the status PDU and if not, sending a polling request requesting another status report to the receiver.

The present invention discloses a method of a receiver for communicating status PDUs to a transmitter in a carrier aggregation environment, comprising sending a first status PDU including a status report indicating status of data transmitted by a transmitter, wherein the status PDU comprises a status report type field indicative of presence of complete status report in the status PDU, receiving a polling request requesting another status report from the transmitter when the status report type field indicates absence of the complete status report in the status PDU and sending a second status PDU including said another status report to the transmitter in response to the polling request.

BRIEF DESCRIPTION OF THE DRAWINGS

The above and other aspects, features and advantages of the present invention will be more apparent from the following detailed description when taken in conjunction with the accompanying drawings, in which.

Figure 1:
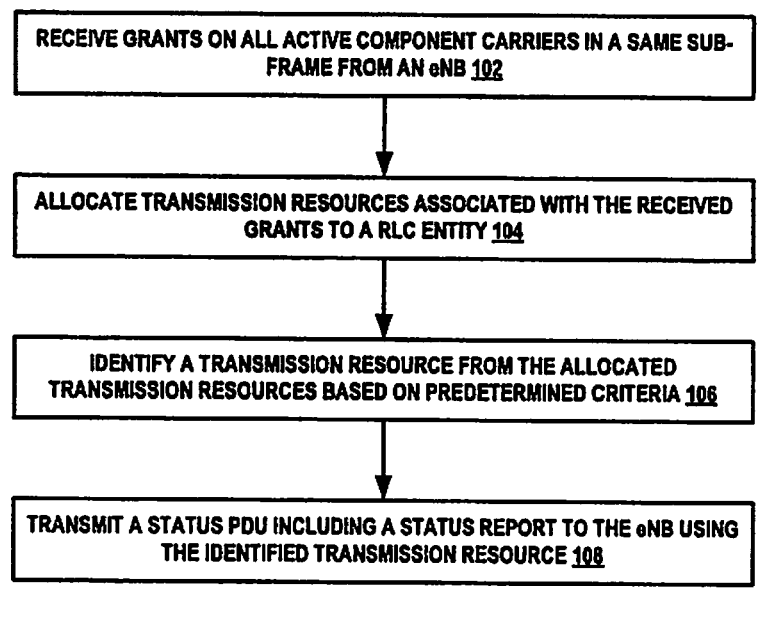
FIG. 1 illustrates a method of communicating status PDUs to an eNB by a UE in a carrier aggregation environment, according to the present invention.

The drawings described herein are for illustration purposes only and are not intended to limit the scope of the present invention in any fashion.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 illustrates a method of communicating status PDUs to an eNB in a carrier aggregation environment, according to the present invention. Consider a carrier aggregation environment where two or more component carriers (e.g., contiguous and/or non-contiguous component carriers) are aggregated in order to support wider transmission bandwidths in wireless communication system such as LTE and LTE-A. Also consider that a UE is configured to aggregate a different number of component carriers originating from the same eNB and of possible different uplink and downlink bandwidths.

In the carrier aggregation environment, at step 102, grants are received on all active component carriers in a same sub-frame or transmission opportunity from the eNB. The grants indicate transmission resources that can be utilized by the UE for data transmission and/or status reporting. The UE may include RLC entities associated with various services. The UE includes a Medium Access Control (MAC) entity which allocates the transmission resources associated with each of the grants to one or more RLC entities for transmitting data PDUs or status PDUs to the eNB. However, for the purpose of illustration, the below steps are described with reference to a single RLC entity.

At step 104, transmission resources associated with the received grants are allocated to a Radio Link Control (RLC) entity by the MAC entity of the UE. At step 106, a transmission resource associated with one of the received grants is identified from the transmission resources by the RLC entity based on criteria, which may be one or more of a signal condition associated with the component carriers, block error rate, lower linked downlink component carrier path loss, lower uplink component carrier frequency, arrival order of grants on the component carriers, reliability, component carrier priority, component carrier bandwidth, associated HARQ profile of the component carriers, and whether component carrier is primary or secondary. The transmission resource associated with the grant is identified for communicating a status PDU including a status report of data PDU reception to the eNB on the associated component carrier.

At step 106, the status PDU including the status report is transmitted to the eNB using the identified transmission resource on the associated component carrier. The status report transmitted in the status PDU may be partial or complete based on optimal transmission resource identified based on the criteria. The other transmission resources associated with remaining grants are allocated to data PDUs to be transmitted/re-transmitted to the eNB on remaining active component carriers.

Figure 2:
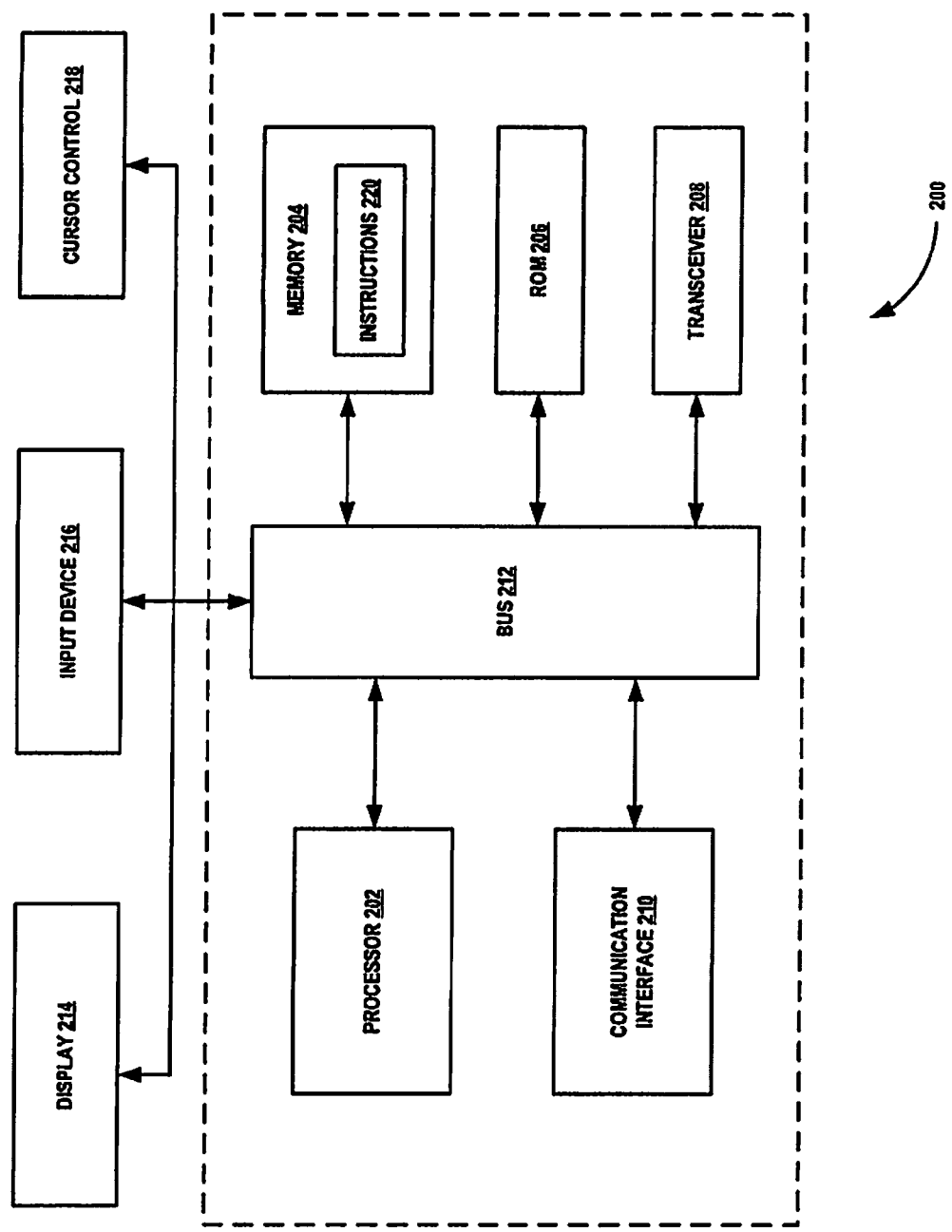
FIG. 2 illustrates a UE showing various components for implementing embodiments of the present invention.

FIG. 2 illustrates components of a UE 200 for implementing embodiments of the present invention. In FIG. 2, the UE 200 includes a processor 202, memory 204, a Read Only Memory (ROM) 206, a transceiver 208, a communication interface 210, a bus 212, a display 214, an input device 216, and a cursor control 218.

The processor 202, as used herein, includes any type of computational circuit, such as a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 202 may also include embedded controllers, such as generic or programmable logic devices or arrays, application specific integrated circuits, single-chip computers, and smart cards.

The memory 204 and the ROM 206 may be volatile memory and non-volatile memory. The memory 204 is configured to temporarily store the instruction(s) capable of communicating status PDUs to an eNB in a carrier aggregation environment, according to one or more embodiments described in FIGS. 1, 3, and 4. A variety of computer-readable storage media may be stored in and accessed from the memory elements. Memory elements may include any suitable memory device(s) for storing data and machine-readable instructions 220, such as read only memory, random access memory, erasable programmable read only memory, electrically erasable programmable read only memory, hard drive, removable media drive for handling compact disks, digital video disks, diskettes, magnetic tape cartridges, memory cards, and Memory Sticks™.

Embodiments of the present subject matter may be implemented in conjunction with modules, including functions, procedures, data structures, and application programs, for performing tasks, or defining abstract data types or low-level hardware contexts. Machine-readable instructions 220 stored on any of the above-mentioned storage media may be executable by the processor 202. For example, a computer program may include machine-readable instructions 220 capable of communicating status PDU including status reports to the eNB in the carrier aggregation environment, according to the teachings and embodiments of the present invention.

The processor 202 may execute the computer program having machine-readable instructions 220 capable of receiving grants on active component carriers from the eNB, allocating transmission resources associated with the grants to at least one RLC entity. The machine-readable instructions 220 further capable of identifying one of the allocated transmission resources associated with one of the grants by the at least one RLC entity based on criteria for communicating a status report. Moreover, the machine-readable instructions 220 capable of transmitting a status PDU including the status report using the identified one of the allocated transmission resources. In the present invention, the program may be included on a Compact Disk-Read Only Memory (CD-ROM) and loaded from the CD-ROM to a hard drive in the non-volatile memory.

The transceiver 208 may be capable of receiving grants on component carriers from the eNB, and transmitting the status PDU including a complete/partial status report to the eNB based on one of the received grants. The bus 212 acts as interconnect between various components of the UE 200. The components such as communication interfaces 210, the display 214, the input device 216, and the cursor control 218 are well known to the person skilled in the art and hence the explanation is thereof omitted.

Figure 3:
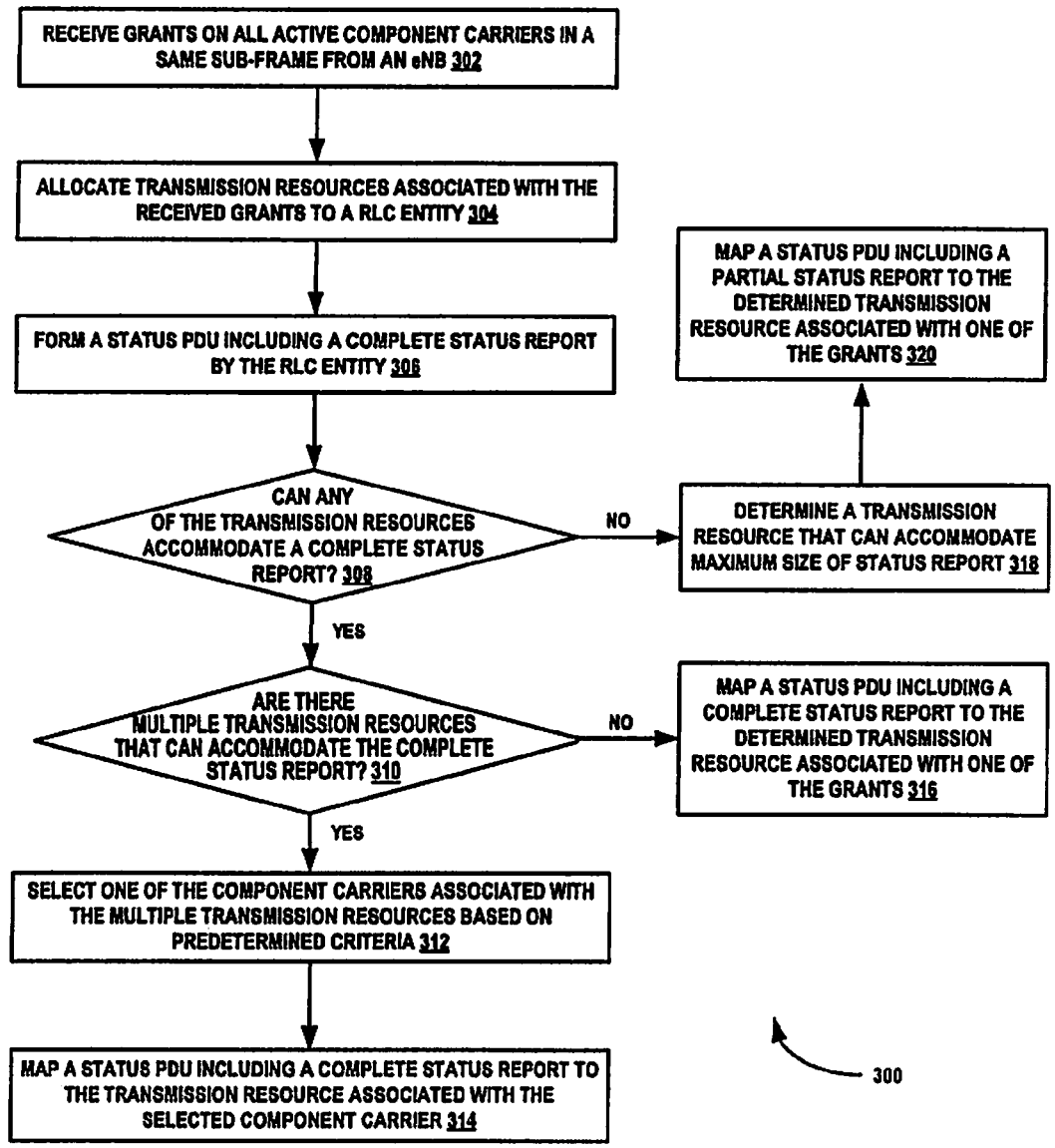
FIG. 3 illustrates a method of mapping status PDUs including a status report to one of allocated transmission resources in the carrier aggregation environment, according to the present invention.

FIG. 3 illustrates a method of mapping status PDUs including status report to one of allocated transmission resources in the carrier aggregation environment, according to the present invention. At step 302, grants on all active component carriers in a same sub-frame are received from the eNB. At step 304, transmission resources associated with the received grants are allocated to a RLC entity by the MAC entity of the UE. At step 306, a status PDU including a complete status report (indicating status of data PDUs transmitted by the eNB) is formed by a RLC entity. At step 308, it is determined whether any of the allocated transmission resources associated with the grants can accommodate the complete status report.

If the complete status report can be accommodated, then at step 310, it is determined whether there are multiple allocated transmission resources that can accommodate the complete status report. If there are multiple allocated transmission resources, then at step 312, one of the component carriers associated with the multiple allocated transmission resources is selected based on the criteria. For example, the criteria may be indicated by the MAC entity to the RLC entity during allocation of the transmission resources (at step 304). It can be noted that selection of the better component carrier helps enhance transmission reliability of status report to the eNB. At step 314, a status PDU including the complete status report is mapped to the allocated transmission resource associated with the selected component carrier.

Alternatively, the transmission resource is selected from the multiple transmission resource based on consideration of avoidance segmentation/re-segmentation of one or more SDUs/PDUs. For example, if multiple transmission resources can accommodate the complete status report, then the status PDU including the complete status report is mapped to a transmission resource that avoids or reduces segmentation/re-segmentation of the one or more SDUs/PDUs. If there is only one allocated transmission resource that can accommodate the complete status report, then at step 316, the status PDU including the complete status report is mapped to the determined allocated transmission resource associated with one of the received grants.

If, at step 308, it is determined that none of the transmission resources can accommodate the complete status report, then at step 318, one of the allocated transmission resources that can accommodate a maximum status report size is determined. In other words, a transmission resource with largest size among the allocated transmission resources is selected for mapping. At step 320, a status PDU including a partial status report is mapped to the determined transmission resource. Then, the status PDU including the complete or partial status report is transmitted to the eNB using the determined transmission resource on the associated component carrier.

Figure 4:
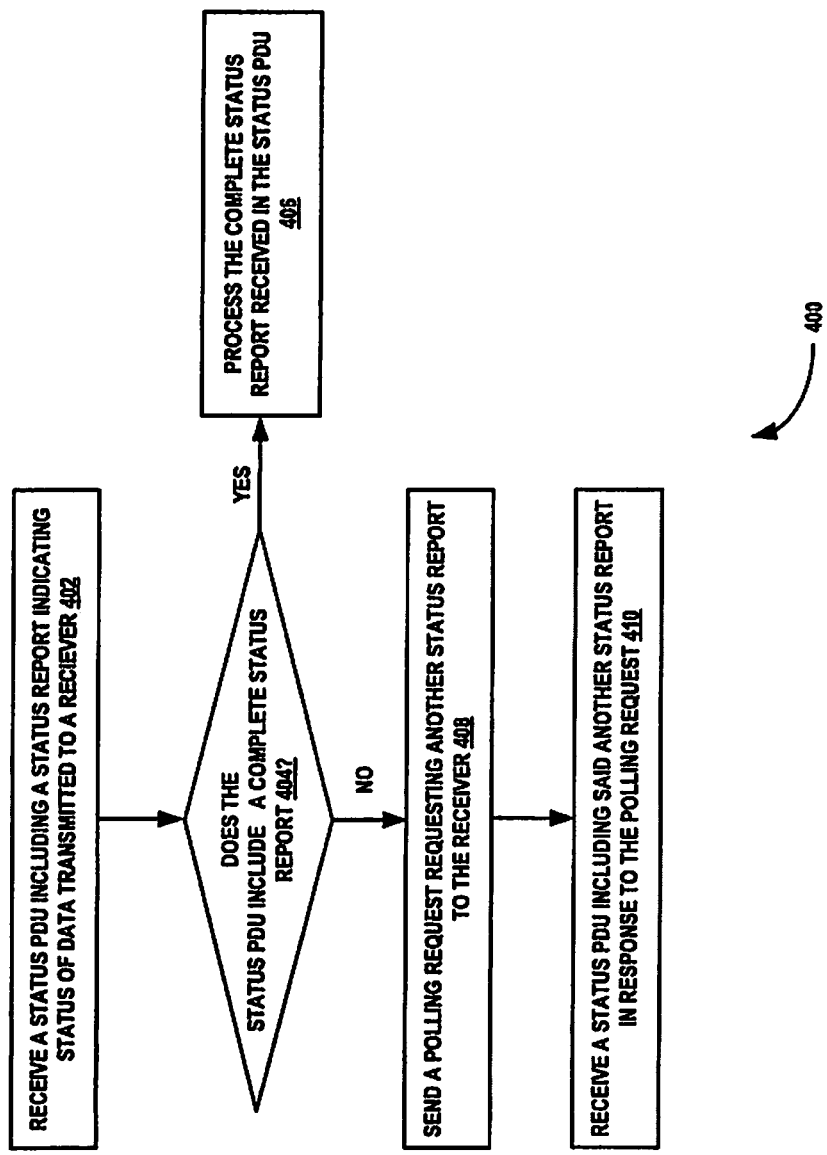
FIG. 4 illustrates a method of a transmitter for obtaining status report information from a receiver in the carrier aggregation environment, according to the present invention.

The inclusion of the partial status report or the complete status report in the status PDU is indicated in a status report type field of the status PDU. The format of the status PDU indicating whether the status report is partial or complete is illustrated in FIG. 4. In the present invention, the eNB utilizes the indication of status report type upon receiving the status PDU, and the eNB identifies a resource grant crunch at the UE and accordingly schedules additional transmission resources for the UE so as to enable transmission of a complete status report. Since the eNB may be aware of RLC configuration at the UE, the eNB accordingly schedules grants on the active component carriers at an appropriate time, such as depending on whether a status prohibit timer is configured. Thus, the UE immediately transmits a status PDU with the complete status report when the status prohibit timer is not configured or upon expiration of the configured status prohibit timer.

Alternatively, when the partial status report indication is received, the eNB identifies the need to generate a status-reporting trigger to the peer side for the complete status report and then sends a polling request. In other words, the reception of the partial status report is regarded as a poll trigger and a poll request is transmitted to the UE upon which the complete status report may be communicated to the eNB by the UE.

Additionally, the status report type indication enhances information conveyed in the partial status report. Upon receiving the partial status report indication, the eNB may interpret ACK_Sequence Number (ACK_SN) in the partial status report as a sequence number of the AMD PDU not received by the UE but could not be negatively acknowledged in the partial status report due to the grant crunch. In some cases, when the transmission resource can accommodate ACK_SN only, no NACK_SN could be included. Therefore, retransmission of the PDU is the only retransmission opportunity for the eNB and can be utilized to convey a poll request to the UE.

When the transmission resources can accommodate a partial status report, a status reporting trigger is generated after transmitting the status PDU including the partial status report to the eNB. The status reporting trigger initiates another status report transmitted when sufficient grant is available and when allowed by the status prohibit timer.

According to the foregoing description, the status PDU may be mapped to first of the transmission resources allocated by the MAC entity. The first transmission resource may be from an ordered set of transmission resources based on reception order of component carriers on a Physical Downlink Control Channel (PDCCH) (i.e. arrival order of grants on component carrier), priority, reliability, signal strength of associated component carrier, grant size, associated Hybrid Automatic Repeat Request profile, retransmission count, whether component carrier is primary or secondary or in random manner). Alternatively, the first transmission resource may be indicated by the MAC entity. When the MAC entity indicates allocated transmission resources in a TTI sequentially to the RLC entity, the first transmission resource is selected for sending the status PDU, and the status PDU can be mapped to the first of the allocated transmission resources that can accommodate a complete status report.

In another embodiment, the status PDU can be mapped to the largest transmission resource indicated by the MAC entity, or the status PDU can be mapped to more than one transmission resource with presence and content suitably indicated in the status PDU.

FIG. 4 illustrates a method of a transmitter for obtaining status report information from a receiver in the carrier aggregation environment, according to the present invention. It is understood that the terms 'transmitter' and 'receiver' referred herein may reside in the UE 200 and an eNB in the carrier aggregation environment. It is further noted that the transmitter and the receiver referred herein are embodiments of the transceiver 208 of FIG. 2.

At step 402, a status PDU including a status report indicating status of data transmitted to a receiver is received from the receiver. At step 404, it is determined whether the status report in the status PDU is a complete status report. In the present invention, the status PDU includes a status report type field indicating presence of complete status report in the status PDU. If the status report is complete, then at step 406, the complete status report received in the status PDU is processed. For example, based on the complete status report, the transmitter may re-transmit NACK data packets and flush ACK data packets.

If the status report is a partial status report, then at step 408, a polling request requesting another status report is sent to the receiver. At step 410, a status PDU including said another status report is received from the receiver in response to the polling request. When the prohibit status timer is configured, the status PDU including said another status report is received from the receiver upon expiration of the prohibit status timer.

Figure 5:
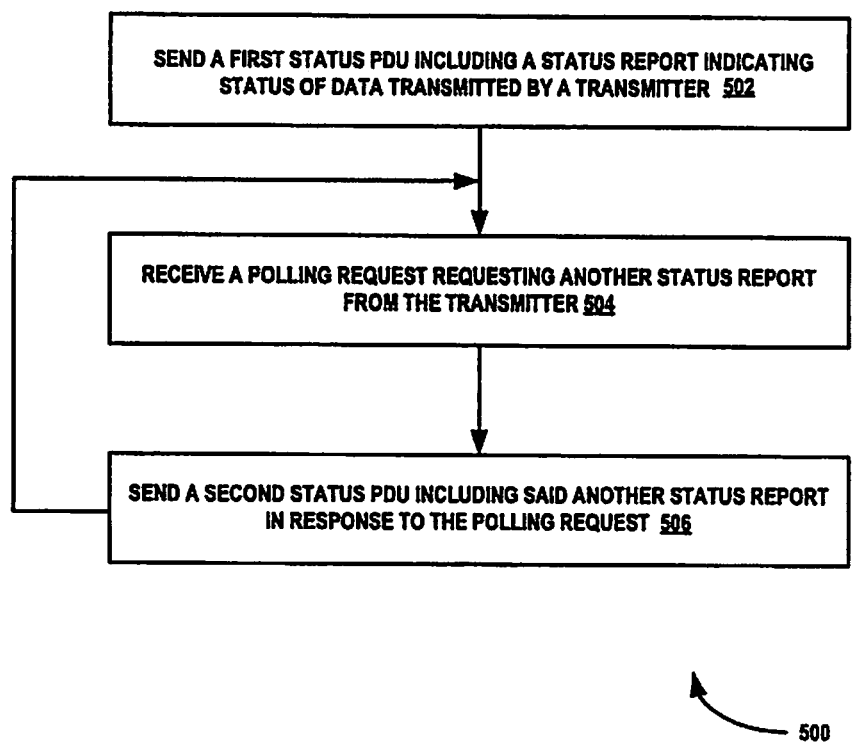
FIG. 5 illustrates a method of a receiver for communicating status PDUs to a transmitter in a carrier aggregation environment, according to the present invention.

FIG. 5 illustrates a method of a receiver for communicating status PDUs to a transmitter in a carrier aggregation environment, according to the present invention. At step 502, a first status PDU including a status report indicating status of data transmitted by the transmitter is sent to the transmitter. The status PDU includes a status report type field that indicates presence of complete status report in the status PDU. At step 504, a polling request requesting another status report is received from the transmitter if the status report type field indicates absence of the complete status report in the status PDU. In other words, the polling request is received when the status PDU includes a partial status report.

At step 506, a second status PDU including said another status report is sent to the transmitter in response to the polling request. In the present invention, it is determined, after receiving the polling request, whether a prohibit status timer is set. If the prohibit status timer is configured, then the second status PDU including said another status report is sent to the transmitter in response to the polling request upon expiration of the prohibit status timer. Otherwise, the second status PDU including said another status report is sent to the transmitter immediately upon receiving the polling request. Step 504 is repeated if the second status PDU includes a partial status report, until a complete status report is sent to the transmitter.

Figure 6:
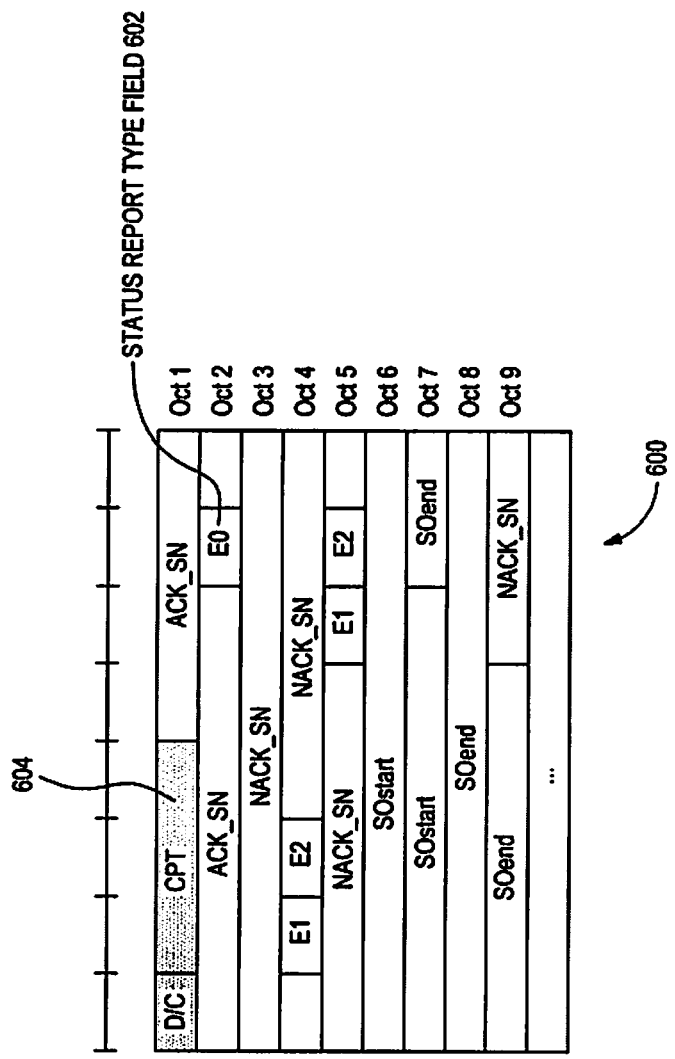
FIG. 6 illustrates a status PDU with a status report type field for indicating a partial or complete status report, according to the present invention.

FIG. 6 illustrates a status PDU 600 with a status report type field 602 for indicating a partial or complete status report, according to the present invention. The status report type field 602 (illustrated as 'E0') indicates whether the status report included in the status PDU 400 is a partial status report or a complete status report. In one example, the RLC entity determines whether any the transmission resources can accommodate a complete status report or only a partial status report can be accommodated. Accordingly, the RLC entity sets 'E0' bit to indicate the type of status report transmitted in the status PDU 600. For example, when the E0 bit in the status PDU 600 is set to '0', the status report type field 602 indicates that the status report is partial. When the E0 bit in the status PDU 600 is set '1', the status report type field 602 indicates that the status report is complete.

The presence of the NACK/E1/E2 fields following the ACK/E0 is identified from the size of the status PDU 600 (as indicated by the lower layer MAC entity). For example, when the MAC indicates size of the status PDU 600 as 2 bytes (e.g., which may be a smallest possible size for the status PDU 600), the eNB interprets that the status PDU 600 includes ACK_SN and there is no NACK/E1/E2 fields in the status PDU 600. However, a size of the status PDU greater than 2 bytes indicates presence of NACK/E1/E2 fields following the ACK_SN/E0 fields. The status report type may also be indicated by incorporating a specific value for a CPT field 604 in the status PDU 600, and the status report type information can be communicated to the eNB using in-band signaling or out-band signaling. Other fields of the status PDU 600 are well known to one skilled in the art and hence the explanation of the other fields is therefore omitted.

The foregoing embodiments can be implemented for transferring SDUs and/or retransmitted PDUs using one of transmission resources associated with grants. This helps avoid segmentation/resegmentation and/or mapping them to one or more allocated transmission resources corresponding to optimal component carriers. As a result, reliability of transmission is ensured and possibility of RRC connection re-establishment due to PDUs reaching a maximum number of retransmissions is avoided when few of the configured set of component carriers have good signal strength. Further, in order to avoid RRC connection re-establishment, the MAC entity and the RLC entity interacts presence of retransmission PDUs in the RLC logical channels. This information can be used by the MAC entity while performing logical channel prioritization so that logical channels having retransmission PDUs gets prioritized for re-transmission on the component carriers with good signal strength.

Although embodiments have been described with reference to specific examples, it will be evident that various modifications and changes may be made to these embodiments without departing from the broader spirit and scope of the present invention. Furthermore, the various devices, modules, selectors, and estimators described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit. Thus, it will be apparent to those ordinary skilled in the art that the invention is not limited to the embodiments described, and can encompass not only the appended claims but also their equivalents.

The invention claimed is:

1. A method for transmitting data by a user equipment (UE) in a wireless communication supporting a carrier aggregation, the method comprising:
   receiving a plurality of grants on a plurality of active component carriers from a base station;
   allocating transmission resources associated with the plurality of grants to at least one radio link control (RLC) entity of the UE;
   identifying at least one of the allocated transmission resources associated with at least one of the plurality of grants by the at least one RLC entity based on criteria for communicating a status report; and
   transmitting, to the base station, a status packet data unit (PDU) including the status report using the identified at least one of the allocated transmission resources,
   wherein the at least one of the allocated transmission resources is identified by determining whether the at least one of the allocated transmission resources accommodates a complete status report that indicates a status of data PDUs transmitted by the base station.

2. The method of claim 1, wherein the criteria is based on one or more of a signal condition associated with the plurality of component carriers, a block error rate, a lower linked downlink component carrier path loss, a lower uplink component carrier frequency, an arrival order of the plurality of grants on the plurality of component carriers, reliability, a component carrier priority, a component carrier bandwidth, an associated hybrid automatic repeat request profile of the component carrier, a retransmission count, whether the component carrier is primary or secondary, and avoidance of segmentation/resegmentation of service data units/PDUs at the at least one RLC entity.

3. The method of claim 2, wherein identifying the one of the allocated transmission resources associated with the at least one of the plurality of grants by the at least one RLC entity based on the criteria for communicating the status report comprises:
   forming a status PDU including the complete status report that indicates the status of the data PDUs transmitted by the base station;
   determining whether any of the allocated transmission resources associated with the plurality of grants can accommodate the complete status report;
   if any of the allocated transmission resources can accommodate the complete status report, mapping a status PDU including the complete status report to the determined at least one of the allocated transmission resources; and
   if none of the allocated transmission resources associated with the plurality of grants can accommodate the complete status report, mapping a status PDU to a maximum size of a transmission resource among the at least one of the allocated transmission resources.

4. The method of claim 3, wherein mapping the status PDU including the complete status report to the determined at least one of the allocated transmission resources comprises:
   determining whether there are multiple allocated transmission resources that can accommodate the complete status report;
   if there are multiple allocated transmission resources that can accommodate the complete status report, selecting at least one of the plurality of component carriers associated with the multiple allocated transmission resources based on the criteria and mapping a status PDU including the complete status report to the allocated transmission resource associated with the selected one of the plurality of component carriers; and
   if there are no multiple allocated transmission resources that can accommodate the complete status report, mapping a status PDU including the complete status report to the determined at least one of the allocated transmission resources.

5. The method of claim 1, wherein the status PDU comprises a status report type field that indicates whether the complete status report is present in the status PDU.

6. The method of claim 3, wherein mapping the status PDU including a maximum size of status report to the at least one of the allocated transmission resources comprises:
   transmitting a status PDU including a partial status report to the one of the allocated transmission resources on an associated at least one of the plurality of component carriers; and
   triggering another status report upon transmitting the status PDU with the partial status report.

7. The method of claim 1, wherein identifying the at least one of the allocated transmission resources associated with the at least one of the plurality of grants by the at least one RLC entity comprises:
   identifying a first transmission resource associated with the at least one of the plurality of grants by the at least one RLC entity from the allocated transmission resources, wherein the allocated transmission resources are received as an ordered set of allocated transmission resources.

8. The method of claim 1, wherein identifying the at least one of the allocated transmission resources associated with the at least one of the plurality of grants by the at least one RLC entity comprises:
   identifying a first transmission resource associated with the at least one of the plurality of grants from the allocated transmission resources by the at least one RLC entity, wherein the allocated transmission resources are sequentially received by the at least one RLC entity.

9. The method of claim 1, wherein identifying the at least one of the allocated transmission resources associated with the at least one of the plurality of grants by the at least one RLC entity comprises:

identifying a first transmission resource associated with the at least one of the plurality of grants from the allocated transmission resources that can accommodate the complete status report.

10. A user equipment (UE) for transmitting data in a wireless communication supporting a carrier aggregation, the UE comprising:
a transceiver configured to transmit and receive the data over a wireless network; and
a controller configured to control receiving a plurality of grants on a plurality of active component carriers from a based station,
allocating transmission resources associated with the plurality of grants to at least one radio link control (RLC) entity of the UE,
identifying at least one of the allocated transmission resources associated with one of the plurality of grants based on criteria for communicating a status report, and
transmitting, to the base station, a status packet data unit (PDU) including the status report using the identified at least one of the allocated transmission resources,
wherein the at least one of the allocated transmission resources is identified by determining whether the at least one of the allocated transmission resources accommodates a complete status report that indicates a status of data PDUs transmitted by the base station.

11. The UE of claim 10, wherein the criteria is based on one or more of a signal condition associated with the plurality of component carriers, a block error rate, a lower linked downlink component carrier path loss, a lower uplink component carrier frequency, an arrival order of the plurality of grants on the plurality of component carriers, reliability, a component carrier priority, a component carrier bandwidth, an associated hybrid automatic repeat request profile of the component carrier, a retransmission count, whether the component carrier is primary or secondary, and avoidance of segmentation/resegmentation of service data units/PDUs at the at least one Radio Link Control (RLC) entity.

12. The UE of claim 10, wherein the status PDU comprises a status report selected from the group consisting of the complete status report and a partial status report.

13. The UE of claim 12, wherein the status PDU comprises a status report type field indicating whether the status report in the status PDU is the complete status report or a partial status report.

14. A method for transmitting data by a user equipment (UE) in a wireless communication supporting a carrier aggregation, the method comprising:
receiving a plurality of grants on a plurality of active component carriers from a base station;
allocating transmission resources associated with the plurality of grants to at least one radio link control (RLC) entity of the UE;
identifying at least one of the allocated transmission resources associated with at least one of the plurality of grants by the at least one RLC entity based on criteria; and
transmitting the data using the identified at least one of the allocated transmission resources,
wherein the at least one of the allocated transmission resources is identified by determining whether the at least one of the allocated transmission resources accommodates at least one retransmission packet data unit (PDU) as the data.

15. The method of claim 14, wherein the transmitted data is selected from the group consisting of a service data unit (SDU) and re-transmitted PDU.

16. The method of claim 15, wherein the criteria is based on one or more of a signal condition associated with the plurality of component carriers, a block error rate, a lower linked downlink component carrier path loss, a lower uplink component carrier frequency, an arrival order of the plurality of grants on the plurality of component carriers, reliability, a component carrier priority, a component carrier bandwidth, an associated hybrid automatic repeat request profile of the component carrier, a retransmission count, whether the component carrier is primary or secondary, and avoidance of segmentation/resegmentation of serve data units/PDUs at the at least one RLC entity.

17. The method of claim 14, wherein identifying the one of the allocated transmission resources associated with the at least one of the plurality of grants by the at least one RLC entity comprises:
identifying a first transmission resource associated with the at least one of the plurality of grants by the at least one RLC entity from the allocated transmission resources, wherein the allocated transmission resources are received as an ordered set of allocated transmission resources.

18. The method of claim 14, wherein identifying the at least one of the allocated transmission resources associated with the at least one of the plurality of grants by the at least one RLC entity comprises:
identifying a first transmission resource associated with the at least one of the plurality of grants from the allocated transmission resources by the at least one RLC entity, wherein the allocated transmission resources are sequentially received by the at least one RLC entity.

19. The method of claim 14, wherein identifying the at least one of the allocated transmission resources associated with the at least one of the plurality of grants by the at least one RLC entity comprises:
identifying a first transmission resource associated with the at least one of the plurality of grants from the allocated transmission resources that can accommodate the at least one retransmission PDU as the data.

20. A user equipment (UE) for transmitting data in a wireless communication supporting a carrier aggregation, the UE comprising:
a transceiver configured to transmit and receive the data over a wireless network; and
a controller configured to control receiving a plurality of grants on a plurality of active component carriers from a base station,
allocating transmission resources associated with the plurality of grants to at least one radio link control (RLC) entity of the UE,
identifying at least one of the allocated transmission resources associated with at least one of the plurality of grants based on criteria, and
transmitting the data using the identified at least one of the allocated transmission resources,
wherein the at least one of the allocated transmission resources is identified by determining whether the at least one of the allocated transmission resources accommodates at least one retransmission packet data unit (PDU) as the data.

21. The UE of claim 20, wherein the transmitted data is selected from the group consisting of a service data unit (SDU) and a re-transmitted PDU.

22. The UE of claim 20, wherein the criteria is based on one or more of a signal condition associated with the plurality of component carriers, a block error rate, a lower linked downlink component carrier path loss, a lower uplink component carrier frequency, an arrival order of the plurality of grants on the plurality of component carriers, reliability, a component carrier priority, a component carrier bandwidth, an associated hybrid automatic repeat request profile of the component carrier, a retransmission count, whether the component carrier is primary or secondary, and avoidance of segmentation/resegmentation of service data units/packet data units at the at least one RLC entity.

* * * * *